Sept. 1, 1959  T. C. WHISLER, SR  2,901,845
DIPPER TEETH

Filed July 14, 1955  2 Sheets-Sheet 1

INVENTOR
THOMAS C. WHISLER, SR
BY *Wallace and Cannon*
ATTORNEYS

Sept. 1, 1959    T. C. WHISLER, SR    2,901,845
DIPPER TEETH
Filed July 14, 1955    2 Sheets-Sheet 2

INVENTOR
THOMAS C. WHISLER, SR
BY Wallace and Cannon
ATTORNEYS

United States Patent Office 2,901,845
Patented Sept. 1, 1959

2,901,845

DIPPER TEETH

Thomas C. Whisler, Sr., Alameda, Calif., assignor to American Brake Shoe Company, New York, N.Y., a corporation of Delaware Application July 14, 1955, Serial No. 522,049

1 Claim. (Cl. 37—142)

This invention relates to dipper teeth and more particularly to a retainer key for a dipper tooth.

It has become common practice to form dipper teeth for excavating shovels of a renewable cap that is removably mounted on an adapter; the adapter in turn including a shank constituting the part of the tooth that is secured to the lip of the shovel.

Some difficulty has been experienced in the field insofar as the securing of the cap to the adapter is concerned, and this has been manifest in a tendency for the cap to work loose or shift on the adapter causing uneven wear and in some circumstances actual breakage of the cap or adapter. Investigations have demonstrated that this is caused in the main by the retainer keys that have been used to hold the cap on the adapter. Thus, retainer keys of the foregoing kind have generally taken two forms. In form one the retainer key includes separate parts having an interposed block of rubber that undergoes compression during insertion of the key into the key way afforded by registered openings in the cap and the adapter, and when fully inserted the key holds the parts together due to the expandable nature of the rubber block. Experience has shown that retainers of this nature are subject to deterioration and progressive ineffectiveness which would account for the manifest problems mentioned above.

Another form of retainer key that has been proposed for dipper teeth of the foregoing kind includes a straight or tapered pin having an end that projects beyond the cap and the adapter when fully inserted, and this exposed end of the pin is then bent over to secure the parts together. To disassemble the parts, it is necessary to straighten the aforementioned bent over end of the pin and repeated operations of this kind are time consuming. Moreover, the end of the pin that is bent often breaks off during use of the tooth.

In view of the foregoing, the primary object of the present invention is to afford a retainer key for dipper teeth of the foregoing kind which does not possess the manifest disadvantages of the retainers of the prior art. More specifically, it is an object of the present invention to enable the cap of a dipper tooth to be held to the adapter by means of a key including a leaf spring of ferrous metal such as steel which is integral with the key and which is adapted to undergo compression during insertion of the retainer, so that when the key is fully inserted in the key way of the cap and the adapter, the leaf spring under compression draws the cap securely up on the adapter. The key and the leaf of the retainer of the present invention are both of ferrous metal and hence are not subject to deterioration, and it is not necessary to bend any part of the retainer to assure that the retainer is maintained in operative position.

A further object of the present invention is to form either the key or the leaf of the retainer with a protuberance or the like adapted to accurately locate and position the retainer in operative position.

Other and further objects of the present invention will be apparent from the following description and claim and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

Figure 1:
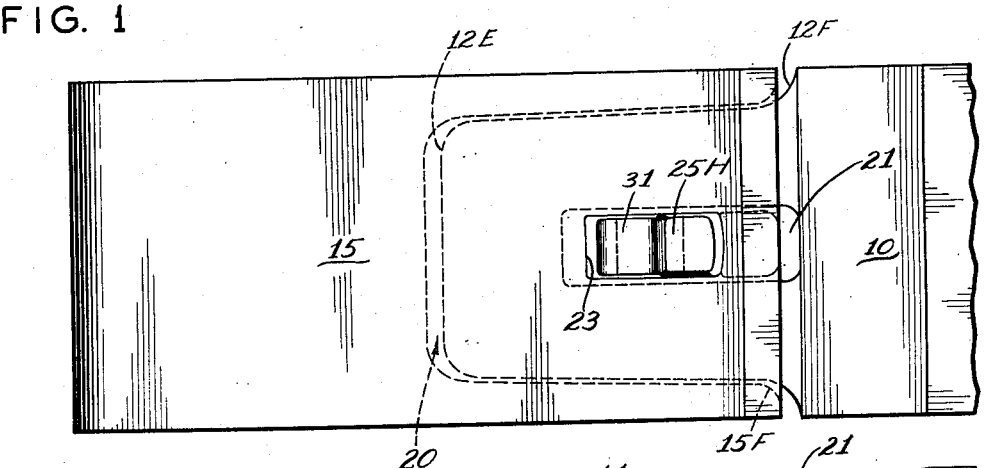
Fig. 1 is a plan view of a cap and adapter of the kind contemplated by the present invention.
Figure 2:
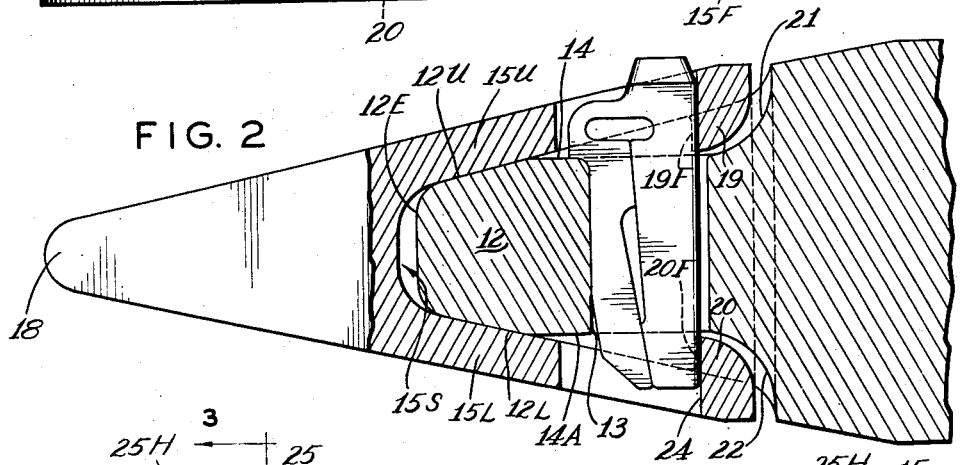
Fig. 2 is a partial longitudinal section of the parts shown in Fig. 1.
Figure 2A:
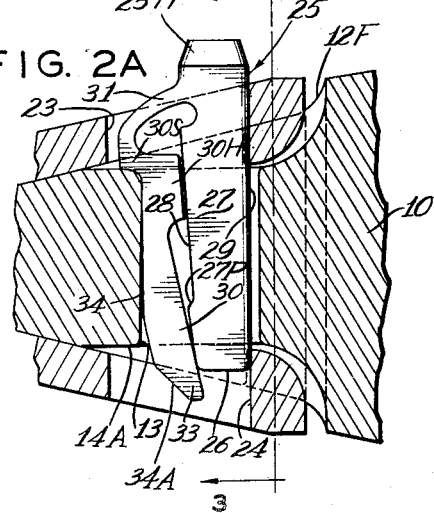
Fig. 2A is a fragmentary section showing the retainer of Fig. 2 in partially inserted position.
Figure 3:
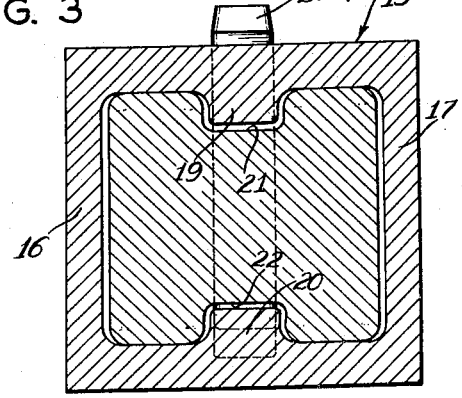
Fig. 3 is a sectional view taken on the line 3—3 of Fig. 2A.

In the drawings, Figs. 1, 2 and 3, one form of the present invention is illustrated in conjunction with a dipper tooth of well known construction, including an adapter 10 having a forwardly projecting nose portion 12 of reduced dimension. Formed medially in the nose 12 is an enlarged vertical opening 13, Figs. 2 and 2A, which opens at the top and the bottom faces of the nose 12, and this opening in part defines a key way as will be described.

Forwardly of the opening 13, the upper face of the nose 12 includes a flat shoulder 14, and it will be observed in Figs. 2 and 2A that there is a like shoulder 14A on the opposed lower face of the nose 12. Forwardly of the shoulders 14 and 14A, the upper and lower faces of the nose 12 converge forwardly at 12U and 12L, respectively, to afford a relatively blunt end 12E of reduced dimension. As shown in Fig. 2, the taper of the nose is filleted peripherally at 12F.

A cap 15 of the kind well known in the art is afforded for the adapter 10 and includes a rearwardly opening socket 15S. The socket 15S is defined by a pair of side walls 16 and 17 and a pair of upper and lower walls 15U and 15L that diverge rearwardly at an angle that is complemental to the upper and lower faces of 12U and 12L of the nose of the adapter. Thus, when the cap 15 is operatively disposed with respect to the adapter 10, the rear end of the cap extends beyond the opening 13 in the nose of the adapter and to enable the cap to take a firm set on the adapter during the use of the tooth the marginal rear end of the cap is peripherally filleted at 15F complemental to the fillet 12F at the base of the adapter nose. The filleted surface 12F and 15F are normally in spaced relation as shown in Fig. 1, and under these circumstances the blunt end 12E of the adapter nose is spaced rearwardly an equal distance with respect to the inner end of the socket 15S as shown in Fig. 2.

It is desirable that further means be afforded to prevent or resist lateral shift of the cap on the adapter, and in the present instance such is attained by lugs 19 and 20 that extend inwardly of the socket 15 in the cap medially of the rear ends of the walls 15U and 15L. It will be appreciated that both the cap and the adapter are of conventional ferrous metal alloy castings and hence the lugs 19 and 20 are cast integral with the cap 15. To receive the lugs 19 and 20 shallow recesses 21 and 22 are afforded at the base of the adapter nose.

The aforementioned key way is defined further in part by relatively large and elongated openings 23 and 24 formed medially in the upper and lower walls of the cap 15 forwardly of the rear ends of these walls, and in the present instance the rear faces of these openings are common with portions of the forward faces 19F and 20F of the lugs 19 and 20 as shown particularly in Figs. 2 and 2A.

When the cap 15 has been operatively positioned on the adapter 10 as aforesaid, the openings 23 and 24 in the upper and lower walls thereof are in registry with the open ends of the opening 13 in the nose of the adapter, and the openings thus in the registry define a key way for receiving a retainer 25, Fig. 2A, as will now be described.

The retainer 25 includes a key 26 having a shank member 27 with opposed front and back faces 28 and 29, and it will be observed that back side 29 lies in a true vertical plane while the front side 28 is tapered slightly inwardly in the direction of an enlarged portion 27P at the lower end of the key shank, and the forward edge of the portion 27P is likewise inwardly tapered for a purpose to be described. At the upper end, the key of the retainer 25 includes a tapered head 25H which is the part of the retainer that is to be driven by a hammer blow or the like to cause the retainer to take a firm purchase in the key way.

The retainer 25 in the present instance is a casting and is so formed as to include a relatively strong but resilient steel leaf spring 30 fabricated to be unitary with the key, being connected at the upper end by a narrow arcuate web 31 to the portion of the key shank 27 that is just below the head 25H. The leaf spring member 30 includes a head 30H, and a projecting shoulder 30S opposite thereto, and depending from the head 30H is a leg 33 of reduced dimension having a tapered forward edge 34. The lower end of the leg 33 is tapered at 34A facilitating insertion of the retainer 25 in the key way with the head 25H uppermost. Prior to the retainer 25 being driven home, the parts of the retainer are initially disposed in the relation shown in Fig. 2A wherein the rear edges of the head 30H and leg 33 of the leaf spring 30 are spaced forwardly of the tapered forward face 28 of the key shank 27 including the enlarged portion 27P and wherein the rear face or side of the leaf spring member between the ends thereof is spaced from the opposed face or side surface of the shank member of the retainer 25 a distance greater than the distance separating the free end 33 of the leaf spring member from such opposed surface of the shank member. It will further be observed in this connection that the lower end of leg 33 of the leaf spring 30 is free of the shank 27 and extends beyond the lower end of the shank 27 of the key and that the shoulder 30S where the web 31 merges into the leg 30 rests on the shoulder 14 in the nose of the adapter. Under these circumstances the opposite end portions of the key shank 27 along the rear side 29 engage the rear faces of the openings 23 and 24 in the cap 15 with the head 25H of the retainer exposed. Inasmuch as the end of the opening 13 corresponding to the tapered end 34A of the retainer 25 is wider than the opposite end corresponding to the head 30H of the retainer, the forward edge 34 of the retainer 25 will be spaced slightly from the forward wall of the opening 13 as clearly shown in Fig. 2A.

Accordingly, when the head 25H of the retainer is impacted the key shank 27 is driven downwardly and the forward tapered face 28 of the key wedges against the opposed, spaced face of the leaf spring 30 which moves theretoward, thereby wedgingly compressing the forward tapered face 34 of the leaf spring 30 tightly against the tapered forward face of the opening 13 in the adapter as enabled by the arcuate portion 31 of the spring 30. This in effect expands the retainer in the opening 13, preventing accidental dislodgment of the retainer 25. Such holds the cap up on the nose of the adapter and the retainer 25 is fully inserted with the end portions of the shank of the key 26 forced tightly into engagement with the opposed faces of the lugs 19 and 20. It will be recognized that the protuberance on the leaf spring afforded by the shoulder 30S serves to limit movement of the retainer through the key way to the extent that the retainer is operatively reposed therein as in Fig. 2. To remove the retainer 25, a sharp impact is delivered to the lower end of the key 26, forcing the key 26 out of the opening 13 and allowing the leaf 30 to bend rearwardly.

In Figs. 4 to 7, the invention is illustrated in modifications which utilize alone the inherent resiliency of the leaf spring that is secured to the key to hold the cap to the adapter, in contrast to the form above described where the key included a tapered face cooperating with the spring. Moreover, as will be described, the leaf spring may be bowed at the medial portion thereof to afford a protuberance that assists in locating the retainer in operative position.

Figure 4:
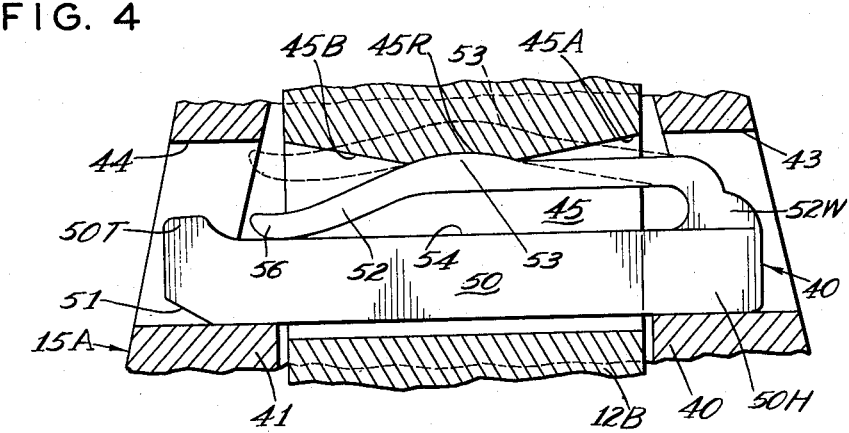
Fig. 4 is a fragmentary sectional view of a modified form of the invention.

Thus, a modified form of construction is illustrated in Fig. 4 where the retainer 40 is shown in operative position holding the cap 15A to the nose 12B of the adapter. The cap 15A includes at the rear end, medially of the lateral extent of the upper and lower walls, inwardly extending lugs 40 and 41 coresponding to the lugs 19 and 20 described above, and the lugs 40 and 41 constitute in effect extensions of the rear faces of the openings 43 and 44 that are afforded in the upper and lower walls of the cap 15A. When the cap 15A has been initially mounted on the nose 12B of the adapter, the openings 43 and 44 which are at the center line of the cap 15A register with the upper and lower ends of the vertical opening 45 extended through the nose of the adapter substantially at the center line thereof. In this instance the forward wall of the opening 45 in the nose of the adapter is defined by the sloped sides 45A and 45B that converge rearwardly to a concave depression 45R formed medially of the vertical extent of the forward wall of the opening 45.

The retainer 40 includes a relatively long key or shank member 50, the rear and forward sides of which are parallel in true vertical planes. The lower end of the key 50 is formed with a forwardly projecting toe 50T, and the rear side of the key 50 opposite the toe 50T is chamfered at 51 to facilitate insertion of the retainer 50 through the opening 43 in the upper wall of the cap 15A. The key 50 includes a head 50H at the end opposite the toe portion 50T, and this head constitutes the part that is to be impacted by a hammer blow or the like to cause the retainer 40 to seat in the operative position shown in Fig. 4.

A relatively strong leaf spring member 52 is cast integrally with the key 50 so as to be connected thereto at but one end by a web 52W. Substantially medially of the length thereof, the spring 52 is formed with a convex protuberance or projection 53 which is complemental to the depression 45R in the forward wall of the opening 45 in the nose of the adapter. Normally, when the retainer 40 is free of the assembled parts, the spring 52 at least at the medial portion is expanded, as indicated by the broken lines in Fig. 4, to a position that extends beyond the forward wall or face of the opening 45 in the adapter nose 12B. When the retainer 40 is driven home, however, by an impact delivered to the head 50H, the rounded projection 53 on the leaf spring 52 advances downwardly along the sloped portion 45A of the forward wall of the opening in the adapter thereby causing the leaf spring 52 to be progressively compressed in the direction of the forward side 54 of the key 50. Such of course is manifest in the lower end of the spring 52 being caused to move downwardly along the forward side 54 of the key 50 in the direction of the toe 50T. Hence, when the retainer 40 has been driven into the key way afforded by the registered openings in the cap and the adapter to the extent that the projection 53 is opposite the depression 45R, the spring 52 then expands or recovers slightly to cause the projection 53 to seat in the depression 45R. This of course is a snap action and serves to locate the retainer 40 in operative position whereat the spring 52 is effective in its compressed state to force end portions at the rear side of the key 50 firmly against the forward faces of the lugs 40 and 41, and in this manner the cap is pulled up on the adapter with a relatively strong force. To extract the retainer 40, it is merely necessary to deliver a blow to the toe portion 50T at the end of the key 50 opposite the head 50H.

Figure 5:
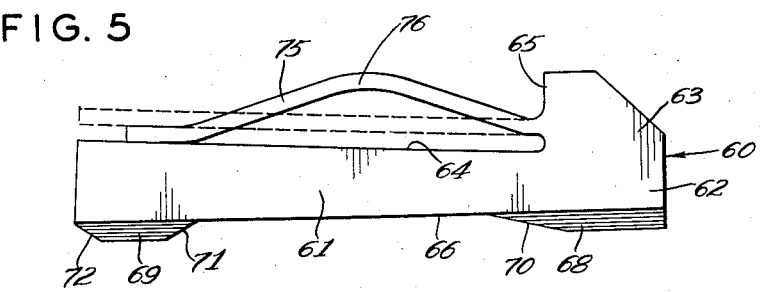
Figs. 5 and 6 are side elevations of further modified forms of the invention.
Figure 6:
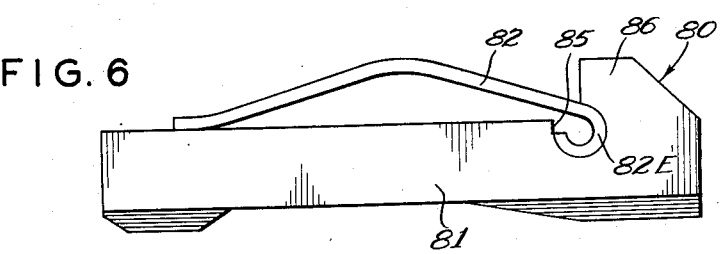
Figure 7:
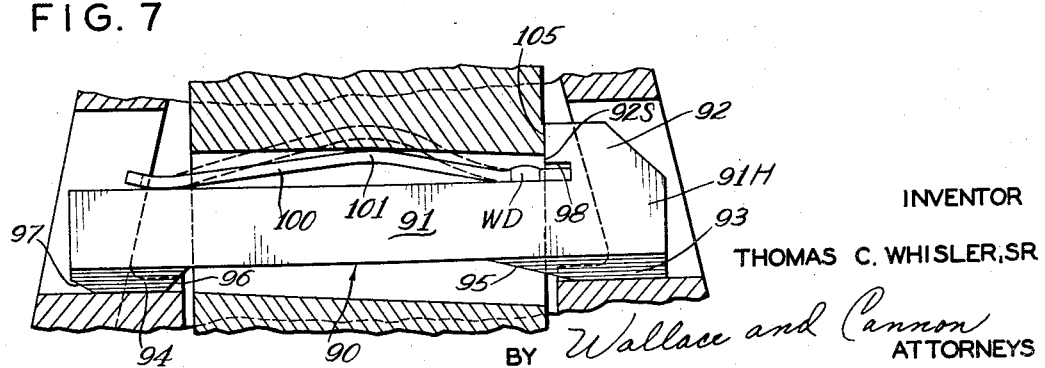
Fig. 7 is a fragmentary sectional view of yet another form of the invention.

In Figs. 5, 6 and 7 additional modifications of the invention are disclosed, and in these instances the shank of the key is formed with spaced apart projections at the side opposite the side on which the leaf spring is disposed, and the purpose of this will be described.

In Fig. 5 for instance it will be observed that the retainer 60 includes a key having a shank member 61, and at one end of the shank the key is formed with a head 62 having a portion 63 that projects beyond the forward side 64 of the key shank thereby affording a projecting shoulder 65 adapted to engage a corresponding shoulder as 14, Fig. 2A, on the nose of the adapter as was described above. At either end of the rear side 66 of the key spaced apart projections 68 and 69 are afforded, and it will be observed that the projection 68 is at the head 62 of the retainer. These projections 68 and 69 are so formed as to facilitate insertion into and withdrawal of the retainer from the key way. Thus, the lower side of the projection 68 is sloped inwardly at 70 to merge into the portion of the key shank that lies between the projections 68 and 69. In like fashion, the projection 69 at the opposite end of the key is sloped inwardly at 71 to merge into the key shank, and the opposite side of the projection 69 is similarly sloped at 72 in the direction of the lower end of the key shank. The way in which these sloped surfaces are utilized will be described below.

Disposed on the side of the key shank opposite the projections 68 and 69 is a leaf spring member 75, and as in the foregoing embodiments of the invention, the leaf spring 75 is fabricated to be integral with the key of the retainer 60. In this instance, the retainer 60 is first forged and a portion of the shank is removed to afford a straight leaf, as indicated by the broken lines in Fig. 5, which is then bent to afford the arcuate portion 76 of leaf spring 75. Thus, the arrangement is such as in the foregoing embodiment, that the leaf spring 75 in its fully extended state is spaced from what constitutes the forward side or edge of the key so as to be yieldable with respect thereto. As in the retainer 40, Fig. 4, the bowed or arcuate portion 76 of the leaf spring 75 in its normally extended state extends beyond what constitutes the forward wall of the opening in the adapter nose serving as a key way, and accordingly when the retainer 60 is driven home the arcuate portion 76 of the leaf spring 75 is compressed against such forward wall to hold the cap on the adapter in the manner described above. Since the retainer 60 is forged to include a projection 65 adjacent the head thereof adapted to locate the retainer accurately in operative position, it is not necessary that the projecting arcuate portion 76 of the spring 75 in this instance be adapted to seat in the depression in the forward wall of the key way opening in the adapter nose.

It is not essential that the leaf spring be fabricated integrally with the key portion of the retainer, since other methods of securement such as an expanding head or a weld or the like may be utilized. Thus, referring to Fig. 6, it will be observed that the retainer comprises a forged or cast key 80 of the kind shown in Fig. 5. A leaf spring 82 corresponding in shape to the leaf spring 75 of Fig. 5 is fabricated separately and is formed at the one end with an eyelet 82E adapted to be forced into a corresponding recess 85 formed in the corner of the shank that is adjacent the forwardly portion 86 at the head of the retainer 80.

If preferred, the leaf spring may be welded to the key as shown in Fig. 7. Thus, the retainer 90 in this instance may be cast or forged to include a key having a shank 91, a head 91H, a portion 92 extending forwardly from the head beyond the forward side of the key shank, and spaced apart projections 93 and 94 at either end of the rear side thereof having sloped sides 95, 96 and 97. The inner corner of the projecting portion 92 of the key is slotted at 98 to receive the upper end of a leaf spring 100 which is formed with an arcuate portion at 101 substantially at the medial portion thereof. The spring 100 in the portion which is free of the slot is drilled to receive a weld deposit WD that rigidly secures the spring to the key of the retainer 90. When the retainer is driven home, the spring 100 is compressed against the forward wall of the opening in the nose of the adapter as above described and such forces the projections 93 and 94 at the rear of the key firmly against the rear walls of the upper and lower openings in the cap of the tooth through which the retainer is to be passed, and in this connection it will be observed that the shoulder 92S afforded by the projection 92 at the head of the retainer engages a complementary portion 105 on the adapter nose. It will be recognized that the sloping sides 95 and 97 of the key facilitate insertion of the retainer in to the key way inasmuch as these surfaces will serve as cam faces guiding the retainer with respect to the lateral rear edges of the openings in the cap, and the surface 96 functions in like manner during withdrawal of the retainer.

From the foregoing, it will be seen that under and in accordance with the present invention a retainer including a key and a leaf spring carried thereby is afforded for holding the replaceable cap of a dipper tooth securely to the adapter, the spring in operative position being compressed within the key way that is afforded by registered openings in the cap and adapter.

I claim:

A dipper tooth assembly comprising an adapter having a forwardly projecting nose portion with a key-way opening formed in said nose portion to open at opposed sides of said nose portion, said nose portion having opposed surfaces presenting a pair of spaced opposed shoulders adjacent said key-way opening, each of said shoulders being selectively adapted to be engaged by a projection on a retainer for the assembly, a removable wear cap for the assembly and having spaced opposed walls shaped complemental to and mounted on the opposed surfaces of said nose portion of the adapter, openings formed respectively in and extended entirely through the opposed walls of said cap, said openings in the cap being so sized and located as to expose said opposed shoulders on the nose of the adapter through said openings in the cap while also exposing said key-way opening, and a retainer forcefully driven into said key-way opening and removably joining the cap to the adapter to prevent displacement of the cap from the adapter, said retainer including an elongated shank member having a face with portions bearing forcefully against adjacent solid parts of said cap, said retainer including an elongated leaf spring member rigidly connected at one end to said shank member on the side thereof opposite said face of the shank member, said spring member extending generally parallel to the axis of said shank member along said side of the shank member with the opposite end of said leaf spring free and unconnected to said shank member and lying closely adjacent said side of the shank member, said leaf spring in the portion between said ends thereof normally being spaced from said side of the key shank a distance differing from the distance separating the free end of said spring member from said side of said shank member to enable the leaf spring to undergo compression in said key-way opening upon driving the retainer into the key-way opening, the outer face of the leaf spring member in the driven and inserted state of the retainer within the key-way opening forcefully engaging in compression a solid portion of the adapter within said key-way opening by virtue of said portion of the leaf spring member being moved closer to the shank member than in the normal state thereof, thereby in effect applying forces to the shank member which draw the cap up on the adapter, and one of said members having a projection adjacent one end thereof engaging one of said shoulders.

References Cited in the file of this patent

UNITED STATES PATENTS

| | | |
|---|---|---|
| 255,843 | De Courcy | Apr. 4, 1882 |
| 417,772 | Deering et al. | Dec. 24, 1889 |
| 1,247,043 | Warne | Nov. 20, 1917 |
| 2,162,811 | Guy | June 20, 1939 |
| 2,219,600 | Potter | Oct. 29, 1940 |
| 2,325,991 | White | Aug. 3, 1943 |
| 2,610,416 | Crawford | Sept. 16, 1952 |
| 2,674,816 | Daniels et al. | Apr. 13, 1954 |
| 2,702,490 | Launder | Feb. 22, 1955 |